US012663108B2

(12) United States Patent
Bao et al.

(10) Patent No.: US 12,663,108 B2
(45) Date of Patent: Jun. 23, 2026

(54) FLEXIBLE PIPE END PORTION CONNECTION STRUCTURE

(71) Applicant: Yantai Jereh Petroleum Equipment & Technologies Co., Ltd., Yantai (CN)

(72) Inventors: Dejian Bao, Yantai (CN); Guoling Ju, Yantai (CN); Shulin Zhang, Yantai (CN); Yilong Zhu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 501 days.

(21) Appl. No.: 18/094,413

(22) Filed: Jan. 9, 2023

(65) Prior Publication Data

US 2023/0160510 A1      May 25, 2023

Related U.S. Application Data

(63) Continuation of application No. PCT/CN2022/109397, filed on Aug. 1, 2022.

(30) Foreign Application Priority Data

Aug. 9, 2021    (CN) .......................... 202121845170.1

(51) Int. Cl.
  *F16L 33/01*        (2006.01)
  *F16L 23/024*       (2006.01)
  *F16L 33/34*        (2006.01)
(52) U.S. Cl.
  CPC ............. *F16L 33/01* (2013.01); *F16L 23/024* (2013.01); *F16L 33/34* (2013.01)

(58) Field of Classification Search
  CPC .......... F16L 33/01; F16L 23/024; F16L 33/34
  USPC .................................. 285/364, 365, 366, 367
  See application file for complete search history.

(56) References Cited

U.S. PATENT DOCUMENTS

| | | | | | |
|---|---|---|---|---|---|
| 3,462,177 | A | * | 8/1969 | Skinner ................... | F16L 33/01 |
| | | | | | 285/148.13 |
| 3,531,143 | A | * | 9/1970 | Sandor .................... | F16L 33/01 |
| | | | | | 138/109 |
| 4,567,916 | A | * | 2/1986 | Antal ...................... | F16L 33/01 |
| | | | | | 138/104 |
| 4,605,466 | A | * | 8/1986 | Eisenzimmer .......... | F16L 33/34 |
| | | | | | 285/915 |

(Continued)

FOREIGN PATENT DOCUMENTS

| | | |
|---|---|---|
| CH | 683554 A5 | 3/1994 |
| CN | 104918769 A | 9/2015 |

(Continued)

*Primary Examiner* — David Bochna
(74) *Attorney, Agent, or Firm* — XSENSUS LLP

(57) ABSTRACT

A flexible pipe end portion connection structure is provided. The flexible pipe end portion connection structure includes a flexible pipe body and a joint. The joint includes a first end and a second end opposite to each other and has a channel extending through the joint in a direction from the first end to the second end. An inner sidewall of the first end of the joint has a plurality of first stepped structures, and an inner diameter of a portion of the channel corresponding to the first stepped structure gradually decreases in the direction from the first end to the second end. At least a part of an end of the flexible pipe body is inserted into the first end of the joint to fit with the first stepped structure.

18 Claims, 3 Drawing Sheets

(56)  References Cited

U.S. PATENT DOCUMENTS

| | | | | |
|---|---|---|---|---|
| 6,315,002 B1 * | 11/2001 | Antal | ...................... | F16L 33/01 |
| | | | | 138/136 |
| 6,692,041 B1 * | 2/2004 | Coulas, Sr. | ........... | F16L 23/024 |
| | | | | 138/109 |
| 8,033,579 B2 * | 10/2011 | Takeda | .................... | F16L 23/08 |
| | | | | 285/112 |
| 9,587,772 B2 * | 3/2017 | Jaspaert | .............. | B29C 66/7394 |
| 11,073,209 B2 * | 7/2021 | Takeda | ................. | F16J 15/3432 |
| 11,293,571 B2 * | 4/2022 | Gray | ......................... | F16L 1/26 |
| 2002/0190522 A1 * | 12/2002 | Grepaly | .................. | F16L 33/34 |
| | | | | 285/222.1 |
| 2009/0295155 A1 * | 12/2009 | Keller-Staub | .......... | F16J 15/127 |
| | | | | 285/365 |
| 2014/0165709 A1 * | 6/2014 | Clements | ................. | G01N 3/12 |
| | | | | 73/49.5 |
| 2017/0167648 A1 * | 6/2017 | Ogawa | .................. | F16L 23/024 |
| 2021/0033223 A1 * | 2/2021 | Baldwin | ................. | F16L 33/34 |
| 2024/0125415 A1 * | 4/2024 | Cook | .................... | F16L 58/187 |

FOREIGN PATENT DOCUMENTS

| | | |
|---|---|---|
| CN | 113167420 A | 7/2021 |
| CN | 215294039 U | 12/2021 |
| GB | 1355567 A | 6/1974 |
| JP | 2004-197827 A | 7/2004 |

* cited by examiner

FLEXIBLE PIPE END PORTION CONNECTION STRUCTURE

The application is a continuation application of International Patent Application No. PCT/CN2022/109397 filed on Aug. 1, 2022, which claims priority to the Chinese patent application No. 202121845170.1 filed on Aug. 9, 2021, and the contents of the above-described patent applications are hereby incorporated in its entirety as part of this application.

TECHNICAL FIELD

At least one embodiment of the present disclosure relates to a flexible pipe end portion connection structure.

BACKGROUND

At present, fracturing technology is widely used in a well site of an oil field. In a fracturing operation process of a fracturing equipment using the fracturing technology in the well site of the oil field, it is necessary to meet requirements of large displacement and high pressure fracturing fluid transportation.

SUMMARY

Embodiments of the present disclosure relate to a flexible pipe end portion connection structure. The flexible pipe end portion connection structure of embodiments of the present disclosure can bear a pressure of an internal high-pressure fluid, and is not easily damaged.

An embodiment of the present disclosure provides a flexible pipe end portion connection structure comprising the flexible pipe end portion connection structure comprises a flexible pipe body and a joint. The joint comprises a first end and a second end opposite to each other and has a channel extending through the joint in a direction from the first end to the second end, an inner sidewall of the first end of the joint has a plurality of first stepped structures, and an inner diameter of a portion of the channel corresponding to the first stepped structure gradually decreases in the direction from the first end to the second end. At least a part of an end of the flexible pipe body is inserted into the first end of the joint to fit with the first stepped structure.

According to an embodiment of the present disclosure, a surface of a portion of the flexible pipe body inserted into the joint has a plurality of second stepped structures, and the plurality of first stepped structures are matched with the second stepped structures so that the portion of the flexible pipe body inserted into the joint fits with the first stepped structure.

According to an embodiment of the present disclosure, the joint is a rigid member.

According to an embodiment of the present disclosure, the channel of the joint comprises a first portion corresponding to the plurality of first stepped structures and a second portion other than the first portion, an inner diameter of the second portion is substantially the same as an inner diameter of the flexible pipe body, and a channel of the flexible pipe body is smoothly connected with the second portion of the channel of the joint.

According to an embodiment of the present disclosure, the flexible pipe body comprises a plurality of layers stacked in sequence from an outer sidewall of the flexible pipe body to an inner sidewall of the flexible pipe body, and the portion of the flexible pipe body inserted into the joint comprises at least two layers close to the inner sidewall of the flexible pipe body, and ends of the at least two layers are staggered from each other to form the plurality of second stepped structures.

According to an embodiment of the present disclosure, at least one layer of the end portion of the flexible pipe body adjacent to the outer sidewall of the flexible pipe body is located on the outer sidewall of the joint.

According to an embodiment of the present disclosure, a portion of the joint corresponding to the plurality of first stepped structures has a through hole connecting an outer sidewall and an inner sidewall of the joint.

According to an embodiment of the present disclosure, each step of the plurality of first stepped structures has at least one through hole, and each through hole is filled with adhesive.

According to an embodiment of the present disclosure, the inner sidewall of the joint with a plurality of first stepped structures is provided with a plurality of zigzag structures, and the plurality of zigzag structures directly contact with the surface of the portion of the flexible pipe body inserted into the joint.

According to an embodiment of the present disclosure, in a sectional view taken in the direction from the first end to the second end, at least one of the plurality of zigzag structures comprises a long side and a short side, an angle between the long side and the direction from the first end to the second end is 15° to 30°, and an angle between the short side and the direction is 60° to 90°.

According to an embodiment of the present disclosure, a ratio of a length of the second portion in the direction from the first end to the second end to the inner diameter of the flexible pipe body is 5:1 to 1.5:1.

According to an embodiment of the present disclosure, the second end of the joint is configured to be connected with an external component using at least one of connection manners of union, flange, clamp, and thread.

According to an embodiment of the present disclosure, the second end of the joint comprises a first flange arranged in a circumferential direction of the joint, and the first flange is configured to connect with the external component.

According to an embodiment of the present disclosure, the flexible pipe end portion connection structure further comprises a flange structure, one end of the flange structure is provided with a second flange arranged in a circumferential direction of the flange structure, an end surface of the first flange and an end surface of the second flange are opposite to each other, and the first flange and the second flange are clamped by a clamp at an outer side surface of the first flange and an outer side surface of the second flange.

According to an embodiment of the present disclosure, the flexible pipe end portion connection structure further comprises a pressure bearing ring, wherein the pressure bearing ring comprises a first pressure bearing portion, a second pressure bearing portion and a support portion, the first pressure bearing portion is located between the clamp and the outer side surfaces of the first flange and the second flange, the second pressure bearing portion is located on an inner side surface of the first flange and an inner side surface of the second flange, and the support portion connects the first pressure bearing portion and the second pressure bearing portion and is located between the end surface of the first flange and the end surface of the second flange.

According to an embodiment of the present disclosure, the flexible pipe body is configured to withstand a pressure above 70 MPa.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

Figure 1:
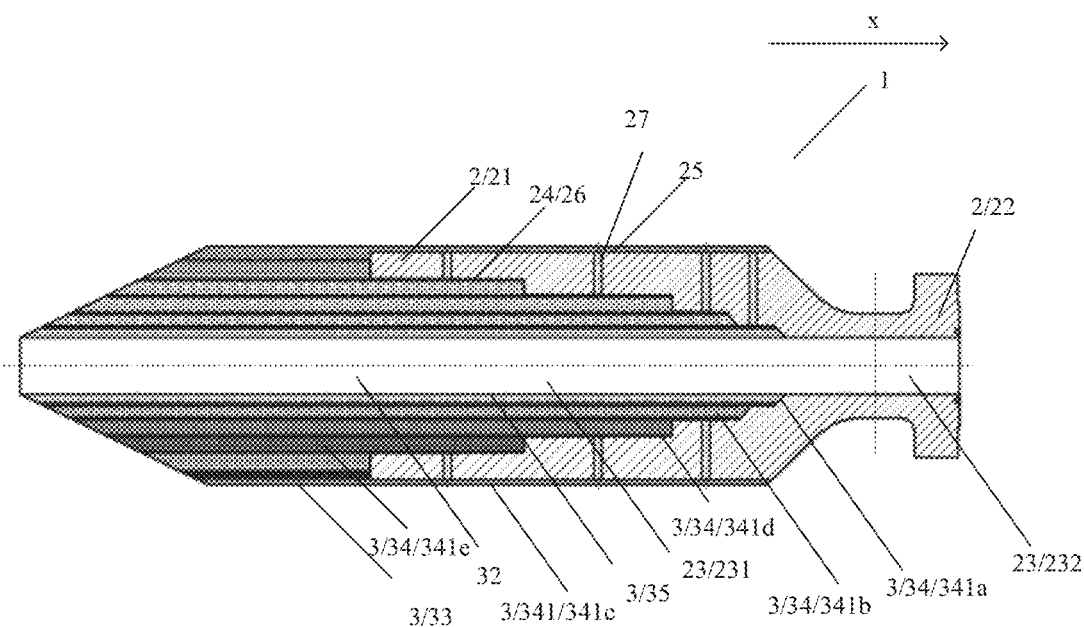
FIG. 1 is a sectional view of a connection between a flexible pipe body and a joint in a flexible pipe end portion connection structure according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Similarly, the terms "comprise," or "include," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

During a fracturing operation process of fracturing equipment in an oil field, it is necessary to meet requirements of large displacement and high pressure fracturing fluid transportation. In the fracturing fluid transportation, metal pipelines have a plurality of connections, a plurality of joints, and a plurality of turns and directions. In the case where the fracturing fluid is transported, the metal pipelines will be greatly eroded and shaken, service life of a product will be reduced, and a risk of unsafety on site may increase. With technological innovation and material development, high-pressure flexible pipe technology has gradually been applied in the well site.

An end portion connection structure of a high-pressure flexible pipe between pipelines in the fracturing fluid transportation comprises two parts: a connection between a high-pressure flexible pipe body and the joint, and a connection between the joint and an external component (the pipeline in fracturing fluid transportation). The connection of the flexible pipe body and the joint comprises two structure forms of non-cemented and cemented. For the non-cemented structure, the pipe body of the flexible pipe is clamped between an inner pipe body and an outer crimping layer of the joint in a form of a crimping structure, and is compressed by a press. This manner has a risk of leakage for a pressure above 70 MPa, and a higher clamping force will cause a risk of deformation of the pipe body and the joint. For the cemented structure, the joint is inserted into the pipe body, and the pipe body is connected with the joint by glue or other loose structure design to ensure sufficient strength and tightness.

The end portion connection of the flexible pipe is required to ensure sufficient bonding strength, no deformation under a high pressure, and is required to have sealing performance under long-term operation, as well as good connection performance to avoid leakage and degumming during use and other issues. Inventors of the present disclosure found that the end connection structure of the high-pressure flexible pipe has at least the following technical problems: (1) in the connection between the pipe body and the joint, a matching structure of the flexible pipe body and the joint is not safe and reliable; (2) in the connection between the joint and the external component, a form of union connection or flange connection is mainly used, specifically, welding or an integral structure is adopted in the union or the flange used for the joint of the flexible pipe body, and a connection of welding is prone to cracks, pores, slag inclusion and other defects.

The present disclosure provides a flexible pipe end portion connection structure that can bear a pressure of an internal high-pressure fluid.

FIG. 1 is a sectional view of a connection between a flexible pipe body and a joint in a flexible pipe end portion connection structure according to an embodiment of the present disclosure.

As illustrated in FIG. 1, a flexible pipe end portion connection structure 1 of an embodiment of the present disclosure comprises a joint 2 and a flexible pipe body 3, and the joint 2 comprises a first end 21 and a second end 22 opposite to each other, and has a channel 23 extending through the joint 2 in a direction x from the first end 21 to the second end 22. An inner sidewall 26 of the first end 21 of the joint 2 has a plurality of first stepped structures 24, and an inner diameter of a portion of the channel 23 corresponding to the first stepped structure 24 gradually decreases in the direction from the first end to the second end, and at least a part of the end of the flexible pipe body 3 is inserted into the first end 21 of the joint 2 to fit with the first stepped structure 24.

According to an embodiment of the present disclosure, the joint 2 of the flexible pipe end portion connection structure 1 has a plurality of first stepped structures, so that the joint 2 can be closely fitted with the inserted flexible pipe body 3, and a connection strength and sealing performance between the joint and the flexible pipe body are good, and an integrated design can be realized. In this way, in the case where high-pressure fluid (for example, petroleum, sour natural gas, fracturing fluid, and water) is transported in the flexible pipe end portion connection structure 1, for example, high-pressure fluid is transported from the flexible pipe body to the joint or from the joint to the flexible pipe body, the flexible pipe end portion connection structure is not easily deformed and damaged, so as to prolong service life of the flexible pipe body.

In some embodiments, a first stepped structure closest to an outer sidewall among the plurality of first stepped structures 24 in contact with the inserted flexible pipe body 3 (a position indicated by a reference numeral 24/26 in FIG. 1) and the direction x (the direction from the first end 21 to the second end 22) form an comprised angle of 5° to 10° to form a draft angle, so as to facilitate an insertion of the flexible pipe body into the pipe body.

In some embodiments, as illustrated in FIG. 1, a surface of the portion where the flexible pipe body 3 is inserted into the joint 2 has a plurality of second stepped structures 34, and the plurality of first stepped structures 24 are matched with the second stepped structures 34 so that the portion of the flexible pipe body 3 inserted into the joint 2 fits with the first stepped structure 24. Here, "match" means, for example, that shapes of the first stepped structure 24 and the second stepped structure 34 are complementary, so that both of them can be closely fitted together.

According to an embodiment of the present disclosure, the surface of the end portion of the flexible pipe body 3 of the flexible pipe end portion connection structure 1 has a plurality of second stepped structures 34, and the first stepped structures 24 are matched with the second stepped structures 34, so that the joint 2 can fit more closely with a contacting portion of the inserted flexible pipe body 3, and the connection strength and sealing performance between the joint and the flexible pipe body are better. In this way, in the case where high-pressure fluid (for example, petroleum, sour natural gas, fracturing fluid, and water) is transported in the flexible pipe end portion connection structure 1, for example, the high-pressure fluid is transported from the flexible pipe body to the joint or from the joint to the flexible pipe body, the flexible pipe end portion connection structure is not easily deformed and damaged, so as to prolong the service life of the flexible pipe body.

In some embodiments, the joint 3 is a rigid member. For example, the joint 3 may comprise an alloy steel material, but it is not limited to this.

The joint of the present disclosure can be fabricated, for example, from a high alloy material by a forging process to ensure that the joint has sufficient strength to bear the pressure of the internal high-pressure fluid. The joint of the present disclosure can be made of corrosion-resistant materials or processed to have corrosion-resistant properties. The joint of the present disclosure can be used in operation environments with ultra-high pressure, high and low temperature in oil fields, and fluid which the joint transports can be petroleum, sour natural gas, fracturing fluid, and water, etc., and an ambient temperature of the joint can reach −60° C., and a withstand fluid temperature of the joint can reach 345° C.

In some embodiments, as illustrated in FIG. 1, the channel 23 of the joint 2 comprises a first portion 231 corresponding to the plurality of first stepped structures 24 and a second portion 232 other than the first portion 231. An inner diameter of the second portion 231 is substantially the same as an inner diameter of the flexible pipe body 3, and the channel 32 of the flexible pipe body 3 is smoothly connected with the second portion 232 of the channel 23 of the joint 3.

According to the embodiment of the present disclosure, the first portion 231 of the channel 23 is provided with the first stepped structure 24, and the inner diameter gradually decreases in the x direction, which increases a contact area between the joint and the flexible pipe body to increase the connection strength. The inner diameter of the second portion 232 of the channel 23 of the joint 2 is substantially the same as the inner diameter of the flexible pipe body 3, and the second portion of the channel of the joint is smoothly connected with the channel of the flexible pipe body 3 to realize a design of a full-bore structure of the flexible pipe end portion connection joint, so as to reduce an erosion effect of the high-pressure fluid through the flexible pipe end portion connection structure and prolong the service life of the flexible pipe.

In some embodiments, as illustrated in FIG. 1, the flexible pipe body 3 comprises a plurality of layers 341 stacked in sequence from an outer sidewall 33 to an inner side wall 35, and the portion of the flexible pipe body 3 inserted into the joint 2 comprises at least two layers close to the inner sidewall 35, for example, a layer 341*a* and a layer 341*b*, and an end of the layer 341*a* and an end of the 341*b* are staggered from each other to form the plurality of second stepped structures 34.

According to an embodiment of the present disclosure, a portion of the plurality of layers of the flexible pipe body 3 close to the inner sidewall at least comprises an inner lining layer 341*a* and a winding layer 341*b*. In the embodiment of the present disclosure, the inner lining layer 341*a* and the winding layer 341*b* are arranged in sequence close to the inner sidewall 35, and an end of the inner lining layer 341*a* and an end of the winding layer 341*b* are staggered with each other. For example, the end of the inner lining layer 341*a* is closer to joint 2 than the winding layer 341*b*. In this way, the inner lining layer 341*a* and the winding layer 341*b* form the second stepped structure. For example, a material of the inner lining layer 314*a* comprises wear-resistant materials (for example, at least one of an engineering plastic, a thermoplastic elastomer, and a rubber-plastic alloy), so as to facilitate the transportation of fluid with strong erosivity. The winding layer 314*b* may comprise metal wires to effectively enhance an internal compression property and a tensile property of the flexible pipe body.

For example, the plurality of layers may further comprise other layers in addition to the inner lining layer 314*a* and the winding layer 314*b*, for example, an isolation layer 314*d* and another winding layer 314*e*, as illustrated in FIG. 1, to form a greater number of the second stepped structure, so that the flexible pipe body and the joint have higher connection strength.

According to an embodiment of the present disclosure, different numbers of steps can be designed according to the pressure of the internal high-pressure fluid that the flexible pipe end portion connection structure needs to bear and the inner diameter of the flexible pipe body. For example, the higher the internal fluid pressure that the flexible pipe end portion connection structure is required to bear, the greater the number of steps, so that the connection strength between the flexible pipe body and the joint in the flexible pipe end portion connection structure is stronger and the sealing performance between the flexible pipe body and the joint in the flexible pipe end portion connection structure is better, so as to maintain no deformation and maintain good sealing performance in the case of long-term operation.

In some embodiments, as illustrated in FIG. 1, at least one layer 341c of the end portion of the flexible pipe body 3 adjacent to the outer sidewall 33 is located on the outer sidewall 25 of the joint 2.

According to an embodiment of the present disclosure, at least one layer 341c of the end portion of the flexible pipe body 3 adjacent to the outer sidewall 33 may be an outer protective layer. For example, the outer protective layer may comprise at least one of a rubber layer and a metal armor layer. The outer protective layer of the embodiment of the present disclosure is provided on the outer sidewall of the flexible pipe body and extends from the flexible pipe body to the outer sidewall of the joint and covers the outer sidewall of the joint, so as to protect the flexible pipe body and the joint from scratches.

In some embodiments, as illustrated in FIG. 1, the portion of the joint 2 corresponding to the plurality of first stepped structures 24 has a through hole 27 connecting an outer sidewall 25 and an inner sidewall 26 of the joint 2.

In some embodiments, as illustrated in FIG. 1, each step of the plurality of first stepped structures 24 has at least one through hole 27, and each through hole is filled with adhesive. In some embodiments, each step of the plurality of first stepped structures 24 may have a plurality of through holes 27, and each through hole is filled with the adhesive. For example, the plurality of through holes 27 at each step may be distributed in a circumferential direction of the joint, but it is not limited to this.

According to an embodiment of the present disclosure, the through hole 27 may be an injection hole. The adhesive can be injected into the joint from the outer sidewall of the joint through the through hole 27, so that the adhesive reaches the inner sidewalls corresponding to the plurality of first stepped structures, and the first stepped structure fits with the second stepped structure. The adhesive fills a gap between the first stepped structure and the second stepped structure, that is, a gap between the flexible pipe body and the joint, thereby a connection sealing and the connection reliability between the flexible pipe body and the joint are ensured.

Figure 2:
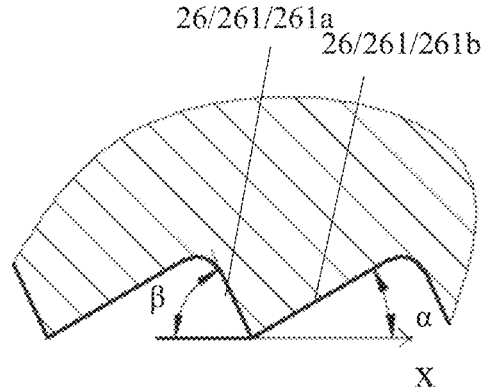
FIG. 2 is a schematic diagram of a zigzag structure on an inner sidewall of the joint in the flexible pipe end portion connection structure according to an embodiment of the present disclosure.

FIG. 2 is a schematic diagram of a zigzag structure on an inner sidewall of the joint in the flexible pipe end portion connection structure according to an embodiment of the present disclosure.

In some embodiments, as illustrated in FIG. 2, the inner sidewall 26 of the joint 2 with a plurality of first stepped structures 34 is provided with a plurality of zigzag structures 261, and the plurality of zigzag structures 261 directly contact with the surface of the portion of the flexible pipe body 3 inserted into the joint 2.

According to an embodiment of the present disclosure, because the inner sidewall of the joint with the plurality of first stepped structures has the zigzag structure, the gap between the first stepped structure and the second stepped structure can be filled more uniformly by the adhesive, so as to further ensure the connection sealing performance and the connection reliability between the flexible pipe body and the joint. In addition, because the zigzag structure is in direct contact with a surface of an insertion structure of the flexible pipe body through an adhesive layer formed by the adhesive injected from the through hole, the zigzag structure itself further has a function of strengthening the connection strength of the flexible pipe body and the joint, and the zigzag structure can fix the adhesive layer to prevent degumming.

In some embodiments, as illustrated in FIG. 2, in a sectional view taken in the direction from the first end 21 to the second end 22, at least one of the plurality of zigzag structures 261 comprises a long side 261a and a short side 261b, an angle between the long side 261a and the direction from the first end 21 to the second end 22 is 15° to 30°, and an angle between the short side 261b and the direction is 60° to 90°.

According to an embodiment of the present disclosure, the angle between the long side of at least one of the plurality of zigzag structures and the direction X is 15° to 30°, and the angle between the short side 261b and the direction X is 60° to 90°, these angles facilitates to the uniform filling of the adhesive between the first stepped structure and the second stepped structure, the strengthening of the connection strength between the first stepped structure and the second stepped structure, and the prevention of degumming.

According to an embodiment of the present disclosure, in a process of assembling the flexible pipe body and the joint, the adhesive can be injected into the joint by the through hole 27, so that the first stepped structure can fit with the first stepped structure, and then the protective layer 341 is used to cover the outer sidewall of the joint, thereby covering the through holes and preventing the adhesive from leaking from the through holes.

In some embodiments, a ratio of a length of the second portion 232 in the direction x from the first end 21 to the second end 22 to the inner diameter of the flexible pipe body is 5:1 to 1.5:1.

According to an embodiment of the present disclosure, the length of the second portion of the joint in the direction x can be designed according to the pressure of the internal fluid which the flexible pipe end portion connection structure is required to bear and the inner diameter of the flexible pipe body. For example, under a condition that the inner diameter of the flexible pipe body is constant, the greater the internal pressure required to bear, the shorter the length of the second portion of the joint in the direction x.

According to an embodiment of the present disclosure, the length of the second portion of the joint in the direction x the number of the first stepped structures of the joint can be designed according to the pressure of the internal fluid which the flexible pipe end portion connection structure is required to bear and the inner diameter of the flexible pipe body. For example, under the condition that the inner diameter of the flexible pipe body is constant, the greater the internal pressure required to bear, the shorter the length of the second portion of the joint in the direction x and the greater the number of the first steps.

In addition to the connection between the joint and the flexible pipe body, the flexible pipe end portion connection structure of the embodiment of the present disclosure further comprises a connection between the joint and an external component. The following embodiments detail the connection between the joint and the external component.

Figure 3:
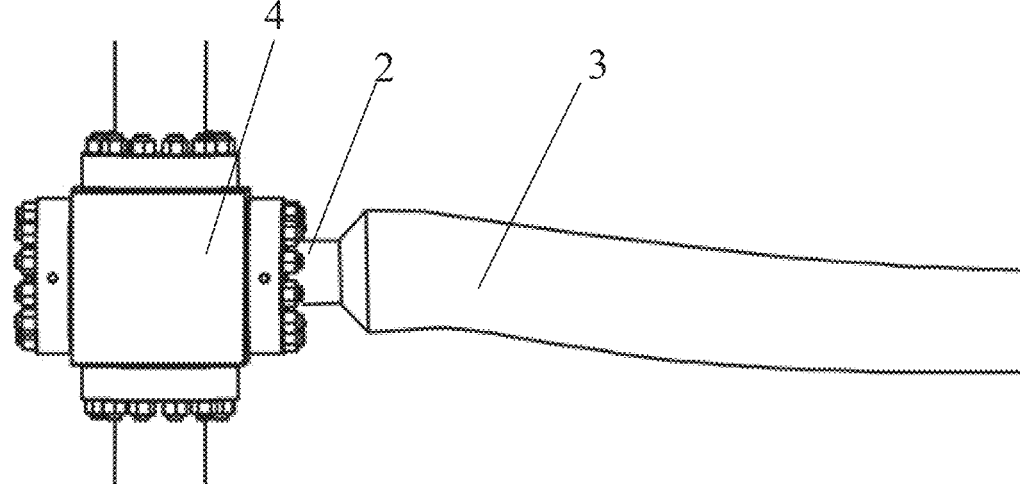
FIG. 3 is a schematic diagram of a connection of the joint and an external component in the flexible pipe end portion connection structure according to an embodiment of the present disclosure.

FIG. 3 is a schematic diagram of a connection of the joint and an external component in the flexible pipe end portion connection structure according to an embodiment of the present disclosure.

In some embodiments, as illustrated in FIG. 3, the second end 32 of the joint 3 is configured to be connected to an external component 4 using at least one of connection manners of union, flange, clamp, and thread. For example, the external component of the embodiments of the present disclosure may be a high pressure manifold skid in a fracturing equipment in an oil field well site or a fluid transportation pipeline of a fracturing pump truck, and the like.

According to an embodiment of the present disclosure, an end of the joint in the flexible pipe end portion connection structure of the present disclosure that is opposite to the flexible pipe body can be connected to the external component 4, so as to realize the connection between the flexible pipe body and a high-pressure fluid transportation pipeline.

Figure 4:
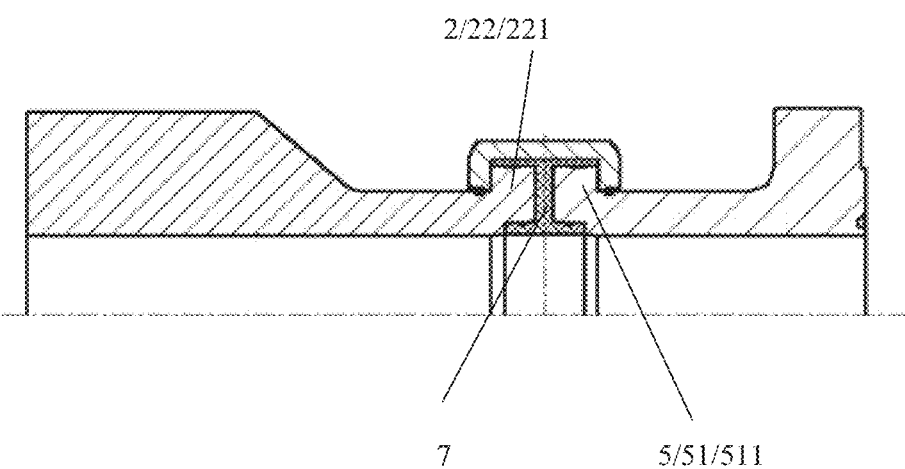
FIG. 4 is a sectional view of a connection of the joint and a flange in the flexible pipe end portion connection structure according to an embodiment of the present disclosure.

FIG. 4 is a sectional view of a connection of the joint and a flange in the flexible pipe end portion connection structure according to an embodiment of the present disclosure.

In some embodiments, as illustrated in FIG. 4, the second end 22 of the joint 2 comprises a first flange 221 arranged in the circumferential direction of the joint 2, and the first flange 221 is configured to connect with the external component 4.

Figure 5:
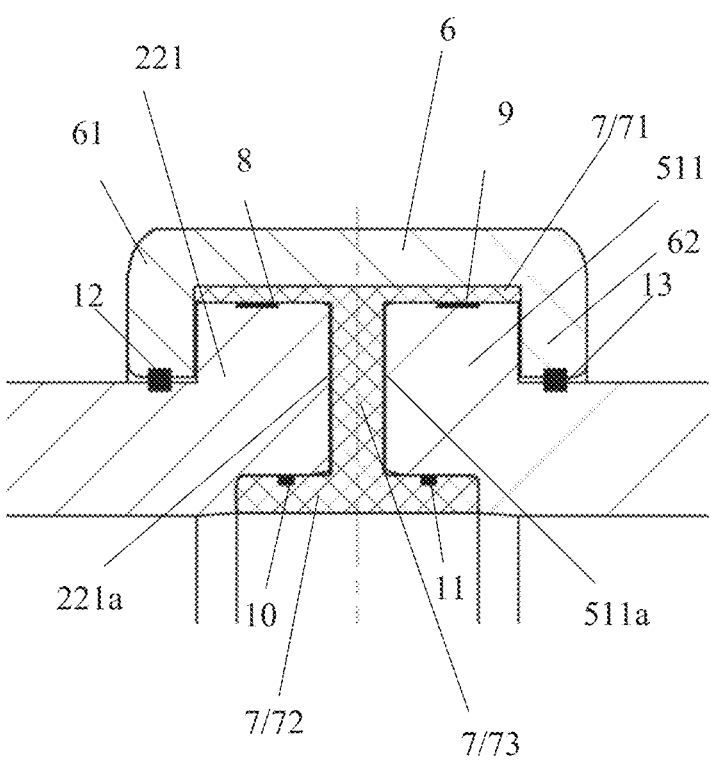
FIG. 5 is an enlarged sectional view of a part of the connection of the joint and the flange in the flexible pipe end portion connection structure of FIG. 4 according to an embodiment of the present disclosure.

FIG. 5 is an enlarged sectional view of a part of the connection of the joint and the flange in the flexible pipe end portion connection structure of FIG. 4 according to an embodiment of the present disclosure.

In some embodiments, as illustrated in FIG. 4 and FIG. 5, the flexible pipe end portion connection structure 1 further comprises a flange structure 5, and one end 51 of the flange structure 5 is provided with a second flange 511 arranged in the circumferential direction, an end surface 221a of the first flange 221 and an end surface 511a of the second flange 511 are opposed to each other, and the first flange 221 and the second flange 511 are clamped by a clamp 6 at an outer side surface of the first flange 221 and an outer side surface of the second flange 511.

In some embodiments, the flange structure 5 may be a rigid member. For example, the flange structure may comprise an alloy steel.

The flange structure of the embodiment of the present disclosure can be fabricated by, for example, a high alloy material by a forging process, so as to ensure that the flange structure has sufficient strength to bear the pressure of the internal high-pressure fluid. Due to a special quenching and tempering process, the flange structure of the present disclosure can be made of corrosion-resistant materials or processed to make the joint have corrosion-resistant properties. The flange structure of the present disclosure can be used in operation environments with ultra-high pressure, high and low temperature in oil fields, and fluid which the flange structure transports can be petroleum, sour natural gas, fracturing fluid, and water, etc., and an ambient temperature of the flange structure can reach $-60°$ C., and a withstand fluid temperature of the flange structure can reach $345°$ C.

In some embodiments, as illustrated in FIG. 5, the flexible pipe end portion connection structure 1 further comprises a pressure bearing ring 7, the pressure bearing ring 7 comprises a first pressure bearing portion 71, a second pressure bearing portion 72 and a support portion 73, the first pressure bearing portion 71 is located between the clamp 6 and the outer side surfaces of the first flange 221 and the second flange 511, and the second pressure bearing portion 72 is located on an inner side surface of the first flange 221 and on an inner side surface of the second flange 511, the support portion 73 connects the first pressure bearing portion 71 and the second pressure bearing portion 72 and is located between the end surface 221a of the first flange 221 and the end surface 511a of the second flange 511.

According to an embodiment of the present disclosure, the other end (not illustrated) of the flange structure may be connected with the external component, and the joint may be connected with the flange structure by clamping the first flange and the second flange through a clamp. The pressure bearing ring is arranged between the clamp and the flange structure and the joint, so as to realize a rotatable connection between the joint and the flange structure, that is, in the case where the joint is connected with the flange structure, the joint can rotate relative to the flange structure at a position. In this way, the connection between the joint and the flange structure functions as fixing and sliding bearing, which facilitates the connection between the flexible pipe end portion connection structure and the external component on site. For example, in a process of connecting the other end of the flange structure with the external component, because the flange structure and the joint can move relatively, the flange structure can be easily connected with the external component at various angles without easily damaging the flexible pipe end portion connection structure. For example, in the case where the flexible pipe end portion connection structure has been connected to the external component, a position of the flexible pipe body connected to the joint can be moved arbitrarily, and because the flange structure and the joint can move relative to each other, the flexible pipe end portion connection structure is not easily damaged.

Furthermore, according to an embodiment of the present disclosure, the first pressure bearing portion of the pressure bearing ring is provided between the clamp and the outer side surfaces of the first flange and the second flange, and the second pressure bearing portion is provided on the inner side surfaces of the first flange and the second flange, that is, the pressure bearing ring of the embodiment of the present disclosure has a symmetrical double-sided annular structure, so that the flexible pipe end portion connection structure can bear the pressure from the internal high-pressure fluid.

In some embodiments, the flexible pipe body 1 is configured to bear a pressure above 70 MPa. The flexible pipe body of the present disclosure can bear a pressure of 70 MPa and above, which maximum can reach 206 MPa, by designing a number of layers between the outer sidewall and the outer sidewall (for example, a number of the winding layers) and the number of the second steps.

According to an embodiment of the present disclosure, the flexible pipe body can bear the pressure of 70 MPa and above, which maximum can reach 206 MPa. In addition, because a stepped connection manner of the flexible pipe body and the joint and a rotary connection manner of the joint and the flange structure mentioned above, the flexible pipe body end portion connection structure of the present disclosure can bear the pressure of 70 MPa and above, which maximum can reach 206 MPa to meet the fluid transportation during the fracturing operation process of the fracturing equipment in the oil field.

In some embodiments, a first support ring 8 is provided at a position where the first pressure bearing portion 71 contacts the outer side surface of the first flange 221, and a second support ring 9 is provided at a position where the first pressure bearing portion 71 contacts the outer side surface of the second flange 511. For example, the first support ring 8 and the second support ring 9 are symmetrically distributed on both sides of the support portion 73. For example, the first support ring extends in the circumferential direction of the joint and the second support ring extends in the circumferential direction of the flange structure.

According to an embodiment of the present disclosure, the first support ring and the second support ring can reduce a friction coefficient in the case where the joint and the flange structure rotate relative to each other, so as to avoid a stagnation between the clamp and other components (including the joint and the flange structure) and make the rotation more flexible.

In some embodiments, a first sealing ring 10 is provided at a position where the second pressure bearing portion 72 contacts the inner surface of the first flange 221, and a second sealing ring 11 is provided at a position where the second pressure bearing portion 72 contacts the inner surface of the second flange 511. For example, the first sealing ring 10 and the second sealing ring 11 are symmetrically distributed on both sides of the support portion 73. For example, various sealing structures such as T-seal, C-seal, S-seal, in for example, rubber and plastic, etc. can be adopted in the first sealing ring and the second sealing ring.

According to an embodiment of the present disclosure, the first sealing ring and the second sealing ring can bear the pressure of the internal high-pressure fluid and can prevent the high-pressure fluid flowing into a gap between the second pressure bearing portion and the first flange and a gap between the second pressure bearing portion and the second flange from flowing out from the flexible pipe body end portion connection structure.

In some embodiments, both ends of the clamp 6 are respectively provided with a first protrusion 61 extending from the outer side surface of the first flange 221 to the inner side surface of the first flange 221 and a second protrusion 62 extending from the outer side surface of the second flange 511 to the inner side surface of the second flange 511. A third sealing ring 12 is arranged between a surface of the first protrusion 61 other than a portion contacting with the first flange 221 and a surface of the joint, and a fourth sealing ring 13 is arranged between a surface of the second protrusion 62 other than a portion contacting with second flange 511 and a surface of the flange structure.

According to an embodiment of the present disclosure, the third sealing ring and the fourth sealing ring can further prevent the high-pressure fluid flowing into a gap between the second pressure bearing portion and the first flange and a gap between the second pressure bearing portion and the second flange from flowing out from the flexible pipe body end portion connection structure.

Figure 6:
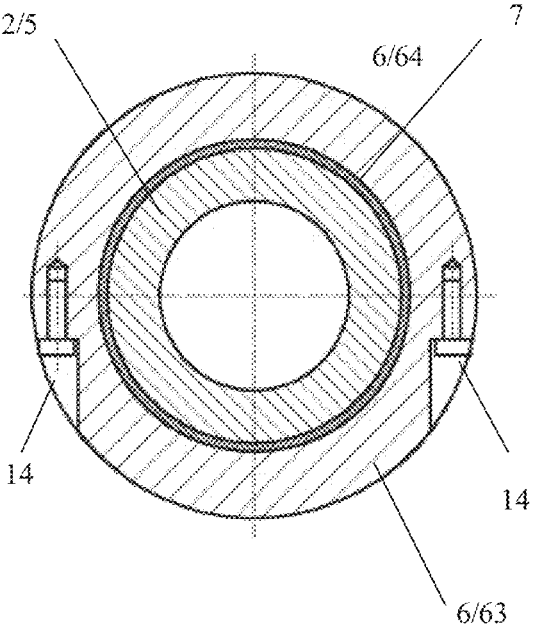
FIG. 6 is a cross-sectional view of a connection of the joint and a flange in the flexible pipe end portion connection structure according to an embodiment of the present disclosure.

FIG. 6 is a cross-sectional view of a connection of the joint and a flange in the flexible pipe end portion connection structure according to an embodiment of the present disclosure.

In some embodiments, as illustrated in FIG. 6, the clamp 6 of the embodiment of the present disclosure may be a split clamp including two sub-sections, for example sub-section 63 and sub-section 64, and the sub-section 63 and sub-section 64 are arranged in the circumferential direction of the first flange and the second flange and fixed together by connection bolts 14.

According to an embodiment of the present disclosure, the joint and the flange structure are clamped by the clamp and the pressure bearing ring is arranged therebetween, and a reasonable small gap matching is adopted to provide a reasonable creeping space for the sealing member.

The flexible pipe body end portion connection structure of the embodiments of the present disclosure provides a more efficient and safer connection form, which is convenient for installation and use during operation process in the oil field on site. In addition to being used in the fracturing operation in the oil field, the flexible pipe body end portion connection structure of the embodiments of the present disclosure can further be applied in operations such as drilling, fracturing, and flowing back in the oil field, as well as other occasions where high-pressure fluid needs to be transported.

What are described above is the embodiments of the disclosure only and not limitative to the scope of the disclosure; any of those skilled in related arts can easily conceive variations and substitutions in the technical scopes disclosed by the disclosure, which should be encompassed in protection scopes of the disclosure. Therefore, the scopes of the disclosure should be defined in the appended claims.

What is claimed is:

1. A flexible pipe end portion connection structure, comprising a flexible pipe body and a joint,
   the joint comprises a first end and a second end opposite to each other, and has a channel extending through the joint in a direction from the first end to the second end, and an inner sidewall of the first end of the joint has a plurality of first stepped structures, an inner diameter of a portion of the channel corresponding to the first stepped structure gradually decreases in the direction from the first end to the second end, and
   at least a part of an end of the flexible pipe body is inserted into the first end of the joint to fit with the first stepped structure,
   wherein a surface of a portion of the flexible pipe body inserted into the joint has a plurality of second stepped structures, and the plurality of first stepped structures are matched with the second stepped structures so that the portion of the flexible pipe body inserted into the joint fits with the first stepped structure and an inner sidewall of each of the plurality of first stepped structures is in direct contact with a step surface of a corresponding one of the second stepped structures, and
   the inner sidewall of the joint with a plurality of first stepped structures is provided with a plurality of zigzag structures, and the plurality of zigzag structures directly contact with the surface of the portion of the flexible pipe body inserted into the joint.

2. The flexible pipe end portion connection structure according to claim 1, wherein the joint is a rigid member.

3. The flexible pipe end portion connection structure according to claim 1, wherein the channel of the joint comprises a first portion corresponding to the plurality of first stepped structures and a second portion other than the first portion, an inner diameter of the second portion is substantially the same as an inner diameter of the flexible pipe body, and a channel of the flexible pipe body is smoothly connected with the second portion of the channel of the joint.

4. The flexible pipe end portion connection structure according to claim 3, wherein a ratio of a length of the second portion in the direction from the first end to the second end to the inner diameter of the flexible pipe body is 5:1 to 1.5:1.

5. The flexible pipe end portion connection structure according to claim 1, wherein the flexible pipe body comprises a plurality of layers stacked in sequence from an outer sidewall of the flexible pipe body to an inner sidewall of the flexible pipe body, and the portion of the flexible pipe body inserted into the joint comprises at least two layers close to the inner sidewall of the flexible pipe body, and ends of the at least two layers are staggered from each other to form the plurality of second stepped structures.

6. The flexible pipe end portion connection structure according to claim 5, wherein at least one layer of the end portion of the flexible pipe body adjacent to the outer sidewall of the flexible pipe body is located on the outer sidewall of the joint.

7. The flexible pipe end portion connection structure of claim 5, wherein each of the plurality of layers stacked in sequence has a substantially uniform thickness.

8. The flexible pipe end portion connection structure according to claim 1, wherein a portion of the joint corresponding to the plurality of first stepped structures has a through hole connecting an outer sidewall and an inner sidewall of the joint.

9. The flexible pipe end portion connection structure according to claim 8, wherein each step of the plurality of first stepped structures has at least one through hole, and each through hole is filled with adhesive.

10. The flexible pipe end portion connection structure according to claim 1, wherein, in a sectional view taken in the direction from the first end to the second end, at least one of the plurality of zigzag structures comprises a long side and a short side, an angle between the long side and the direction from the first end to the second end is 15° to 30°, and an angle between the short side and the direction is 60° to 90°.

11. The flexible pipe end portion connection structure according to claim 1, wherein the second end of the joint is configured to be connected with an external component using at least one of connection manners of union, flange, clamp, and thread.

12. The flexible pipe end portion connection structure according to claim 11, wherein the second end of the joint comprises a first flange arranged in a circumferential direction of the joint, and the first flange is configured to connect with the external component.

13. The flexible pipe end portion connection structure according to claim 12, further comprising a flange structure, wherein one end of the flange structure is provided with a second flange arranged in a circumferential direction of the flange structure, an end surface of the first flange and an end surface of the second flange are opposite to each other, and the first flange and the second flange are clamped by a clamp at an outer side surface of the first flange and an outer side surface of the second flange.

14. The flexible pipe end portion connection structure according to claim 13, further comprising a pressure bearing ring, wherein the pressure bearing ring comprises a first pressure bearing portion, a second pressure bearing portion and a support portion, the first pressure bearing portion is located between the clamp and the outer side surfaces of the first flange and the second flange, the second pressure bearing portion is located on an inner side surface of the first flange and an inner side surface of the second flange, and the support portion connects the first pressure bearing portion and the second pressure bearing portion and is located between the end surface of the first flange and the end surface of the second flange.

15. The flexible pipe end portion connection structure of claim 1, wherein the flexible pipe body is configured to withstand a pressure above 70 MPa.

16. The flexible pipe end portion connection structure of claim 1, wherein an inner sidewall of one of the plurality of first stepped structures closest to an outer sidewall in contact with the inserted flexible pipe body and a direction from the first end to the second end form an included angle of 5° to 10° to form a draft angle.

17. A flexible pipe end portion connection structure, comprising a flexible pipe body and a joint, the joint comprises a first end and a second end opposite to each other, and has a channel extending through the joint in a direction from the first end to the second end, and an inner sidewall of the first end of the joint has a plurality of first stepped structures, an inner diameter of a portion of the channel corresponding to the first stepped structure gradually decreases in the direction from the first end to the second end, and at least a part of an end of the flexible pipe body is inserted into the first end of the joint to fit with the first stepped structure, wherein a surface of a portion of the flexible pipe body inserted into the joint has a plurality of second stepped structures, and the plurality of first stepped structures are matched with the second stepped structures so that the portion of the flexible pipe body inserted into the joint fits with the first stepped structure and an inner sidewall of each of the plurality of first stepped structures is in direct contact with a step surface of a corresponding one of the second stepped structures, and an inner sidewall of one of the plurality of first stepped structures closest to an outer sidewall in contact with the inserted flexible pipe body and a direction from the first end to the second end form an included angle of 5° to 10° to form a draft angle.

18. A flexible pipe end portion connection structure, comprising a flexible pipe body and a joint, the joint comprises a first end and a second end opposite to each other, and has a channel extending through the joint in a direction from the first end to the second end, and an inner sidewall of the first end of the joint has a plurality of first stepped structures, an inner diameter of a portion of the channel corresponding to the first stepped structure gradually decreases in the direction from the first end to the second end, and at least a part of an end of the flexible pipe body is inserted into the first end of the joint to fit with the first stepped structure, wherein a surface of a portion of the flexible pipe body inserted into the joint has a plurality of second stepped structures, and the plurality of first stepped structures are matched with the second stepped structures so that the portion of the flexible pipe body inserted into the joint fits with the first stepped structure and an inner sidewall of each of the plurality of first stepped structures is in direct contact with a step surface of a corresponding one of the second stepped structures, a portion of the joint corresponding to the plurality of first stepped structures has a through hole connecting an outer sidewall and an inner sidewall of the joint, and each step of the plurality of first stepped structures has at least one through hole, and each through hole is filled with adhesive.

* * * * *